Patented Oct. 3, 1939

2,174,739

UNITED STATES PATENT OFFICE 2,174,739

REMOVAL OF MOISTURE FROM GASES IN THE MANUFACTURE OF CONTACT SULPHURIC ACID

Peter S. Gilchrist, Charlotte, N. C., and James M. Rumple, Flushing, N. Y., assignors to Chemical Construction Corporation, New York, N. Y., a corporation of Delaware Application July 29, 1936, Serial No. 93,136

2 Claims. (Cl. 23—175)

This invention relates to the production of strong sulphuric acid or oleum from hot gases containing sulphur dioxide together with relatively large amounts of water vapor. More specifically, the invention deals with the production of strong sulphuric acid of the above character from wet sulphur dioxide gases which are generated by processes evolving relatively large amounts of heat, and utilizes a portion of this heat for removing excess moisture from the gases. An object of the invention is to provide a process and apparatus for the utilization of waste heat evolved in the generation or purification wet sulphur dioxide gases for removing moisture therefrom, thereby permitting the production of strong sulphuric acid from sources of sulphur dioxide which have hitherto been considered as unavailable for this purpose.

In many chemical processes, such as the smelting of sulphide ores and particularly in the refining of petroleum large amounts of by-products containing sulphur are evolved in such a form that it has been considered difficult or impossible to convert their sulphur content to sulphuric acid with any degree of economy. For example, the fumes from the burning of iron, copper and zinc ores containing sulphides of these metals are highly contaminated with impurities and must be washed before the gases are sufficiently pure for use, the resulting gases having a high moisture content. The present invention is well adapted for the conversion of waste gases from these processes into concentrated sulphuric acid or oleum.

Another source of wet sulphur dioxide gases which may be treated in accordance with the invention for the production of concentrated sulphuric acid or oleum is the acid sludge kilns described in Patent No. 1,953,225 to Hechenbleikner, No. 2,028,713 to Bartholomew and in Patent No. 2,028,725 to J. M. Rumple, one of the present applicants, all of which deal with the recovery of sulphur dioxide from the acid sludge produced in the refining of petroleum. In the processes of these patents sulphur dioxide gases are evolved by the thermal decomposition of acid sludge, which gases may contain hydrocarbons in greater or lesser amounts. When substantial amounts of hydrocarbons are present, the gases are preferably purified by combustion with air and additional fuel if necessary, which generates steam from the hydrogen of the hydrocarbons and liberates large amounts of heat into the gases.

Figure 2:
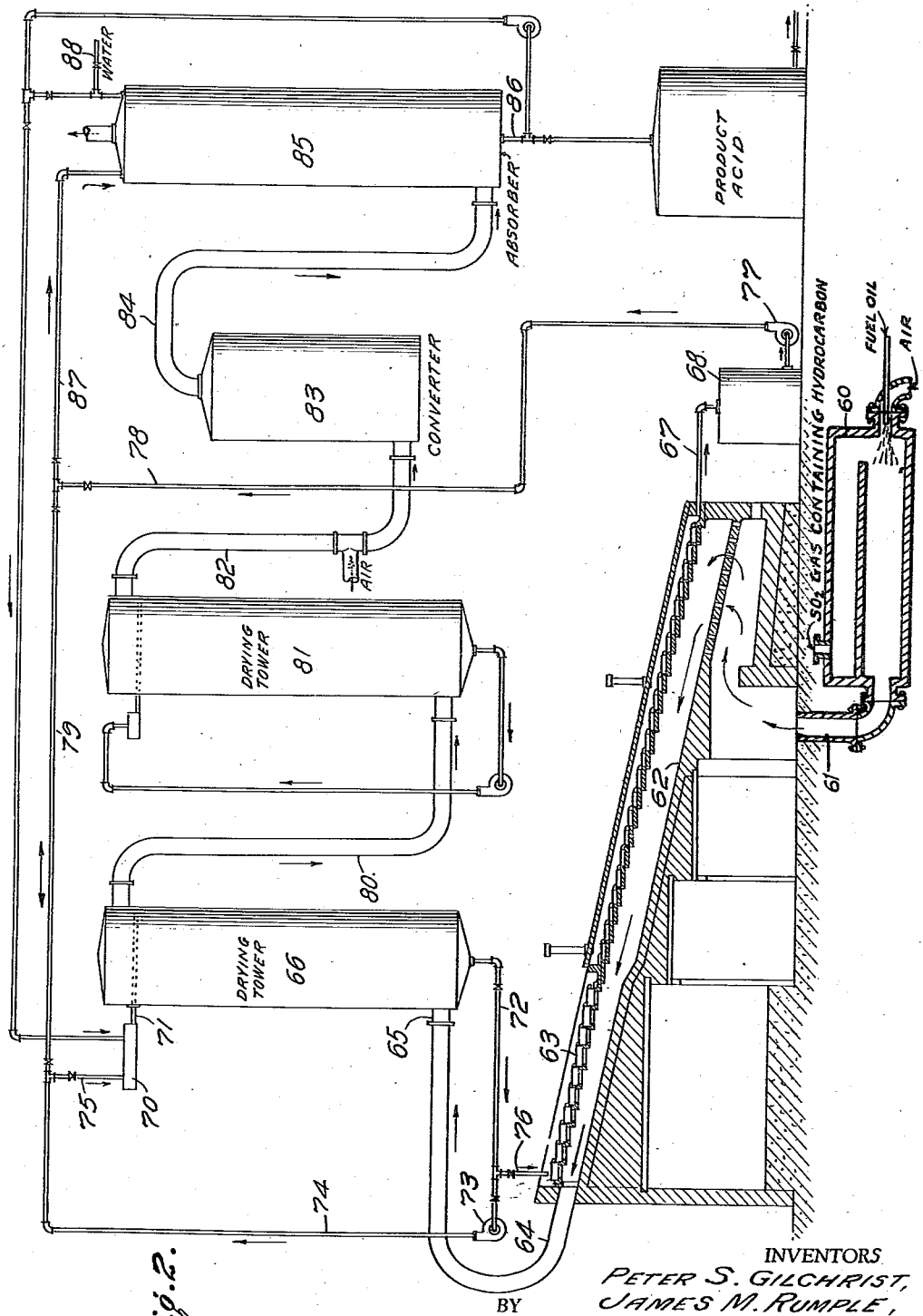

A suitable furnace for this purpose is shown in Fig. 2 of the drawings. In the operation of such a furnace, hot sulphur dioxide gases containing hydrocarbons are subjected to a preliminary cooling and condensation treatment and the uncondensable hydrocarbons are then burned in the secondary furnace shown for the purpose of further purification. In this furnace, much heat is evolved from the combustion of the hydrocarbons and any additional fuel that may be added, and the gases leaving it are heavily loaded with moisture. It is an additional object of the invention to utilize the heat evolved in purification processes of this nature for removing water from the gases evolved therefrom, in order that these gases may be used for the production of concentrated sulphuric acid or oleum.

Still another source of wet sulphur dioxide, and one which it is a chief object of the present invention to utilize, is the burning of hydrogen sulphide which is recoverable from most oil-cracking still gases and which has hitherto not been considered useful as a source for the production of sulphuric acid because of the large amounts of water in the sulphur dioxide gases produced when it is burned.

From the above it will be seen that the invention may be employed for the production of strong sulphuric acid or oleum from sulphur dioxide gases in any case where heat is generated in the production and/or purification of the gases and a wet gas results therefrom.

In accordance with the present invention, wet sulphur dioxide gases from the above or other sources are dried by contacting them with a portion of a recirculating flow of sulphuric acid of a strength suitable for the removal of a substantial proportion of their moisture, all or a portion of this drying acid then being drawn off from the recirculating stream and concentrated by the application of heat. The partially concentrated acid so obtained is then reintroduced into the drying system, or used elsewhere in the process.

In applying the above principles to wet sulphur dioxide gases from varying sources, various modifications in the process and apparatus must be resorted to in order to establish a heat balance and a water balance in the process, and the invention will be illustrated in conjunction with gases from certain specific sources in order to illustrate the principles involved. It should be understood, however, that the invention is of general utility and can be applied to wet sulphur dioxide gases from any source.

One of the most useful fields of application of the invention is in the production of sulphuric acid from hydrogen sulphide or wet gases containing it, for the combustion of this material produces a gas containing large amounts of water vapor and evolves considerable amounts of heat. The invention will be specifically illustrated in conjunction with a method and apparatus for the utilization of this raw material, and certain of the more specific claims appended hereto will be directed to this process, but it should be understood that this is merely illustrative of the broad principles of the invention and that gases from any of the above or other sources may be used in the same manner.

The chemical reaction which takes place when hydrogen sulphide is burned with air is as follows:

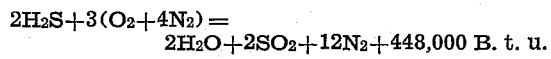

From this it will be seen, first, that a volume of steam is produced by the combustion equal to the volume of sulphur dioxide and, secondly, that a large amount of heat is evolved by the reaction. Upon the oxidation of the sulphur dioxide to sulphur trioxide and absorption of the latter in 98% sulphuric acid, an amount of water is taken up that is exactly equivalent to that given off in the hydrogen sulphide combustion, in accordance with the reaction

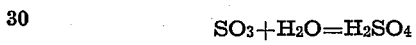

If perfect conversion efficiency were obtained in the catalytic converter and if bone dry air were used for the combustion, it is apparent that no water would need to be added or removed for the production of sulphuric acid monohydrate from hydrogen sulphide, although oleum could not be produced by the process. However, it is practically impossible to obtain such conditions in actual plant operation. Accordingly, in the utilization of hydrogen sulphide as raw material for the manufacture of sulphuric acid dehydration of the burner gases is necessary, and the degree of dehydration must be increased when oleum is to be produced.

The present invention supplies an economical method of dehydrating the sulphur dioxide gases by taking advantage of the high combustion temperatures of hydrogen sulphide and the large amount of heat evolved. According to the present invention this heat is employed to concentrate drying tower acid so that the excess of water in the system over that necessary to combine with the $SO_3$ produced in the oxidation step is removed by the heat of combustion. Thus the hydrogen content of the hydrogen sulphide which renders this gas undesirable as a raw material in ordinary processes is used as fuel to evaporate off the excess water produced when it is burned. By employing this process it is possible to make an oil refinery not only self-containing insofar as sulphur containing raw materials is concerned, but in most refineries the amount of hydrogen sulphide available is more than necessary to make up sulphuric acid losses in the treatment of oil fractions and therefore a refinery may actually produce a surplus of sulphuric acid.

The method of utilizing the heat of combustion of the hydrogen sulphide gas may be either direct or indirect. In other words, the hot gases may be directly employed in heating the acid concentrator or they may be passed through a waste heat boiler and the steam thus produced may be employed as the gaseous heating medium. Similarly, other methods of heat transfer may be employed and the invention in its broader aspects is not limited to any particular form of heat transfer.

In oil refineries where acid sludge is decomposed in a rotary kiln, such as described in the patents above referred to, it frequently happens that more steam is evolved than can be distilled from drying tower acid by the heat contained in the gases. In such cases, it is possible to combine the principles of the present invention with those of Patent No. 2,028,725 above referred to by heating the hot balls employed in the process with heat evolved in the combustion of hydrogen sulphide. This possibility arises by reason of the fact that more heat is given off in the combustion of hydrogen sulphide than is necessary to remove the water produced from drying tower acid, and the combination of the present invention with a rotary kiln process provides an attractive method of utilizing the excess heat.

Another method in which excess heat from the combustion of hydrogen sulphide may be employed is in the reconcentration of weak sludge acid which is produced when acid sludge is diluted with water to separate out the tar. In many cases the heat evolved in the combustion of hydrogen sulphide from the crude oil distillation is sufficient to reconcentrate this weak sludge acid for re-use in oil refining as well as to remove excess moisture from the sulphur dioxide evolved in the hydrogen sulphide combustion, and the combination of these two processes constitutes another feature of the present invention.

Figure 1:
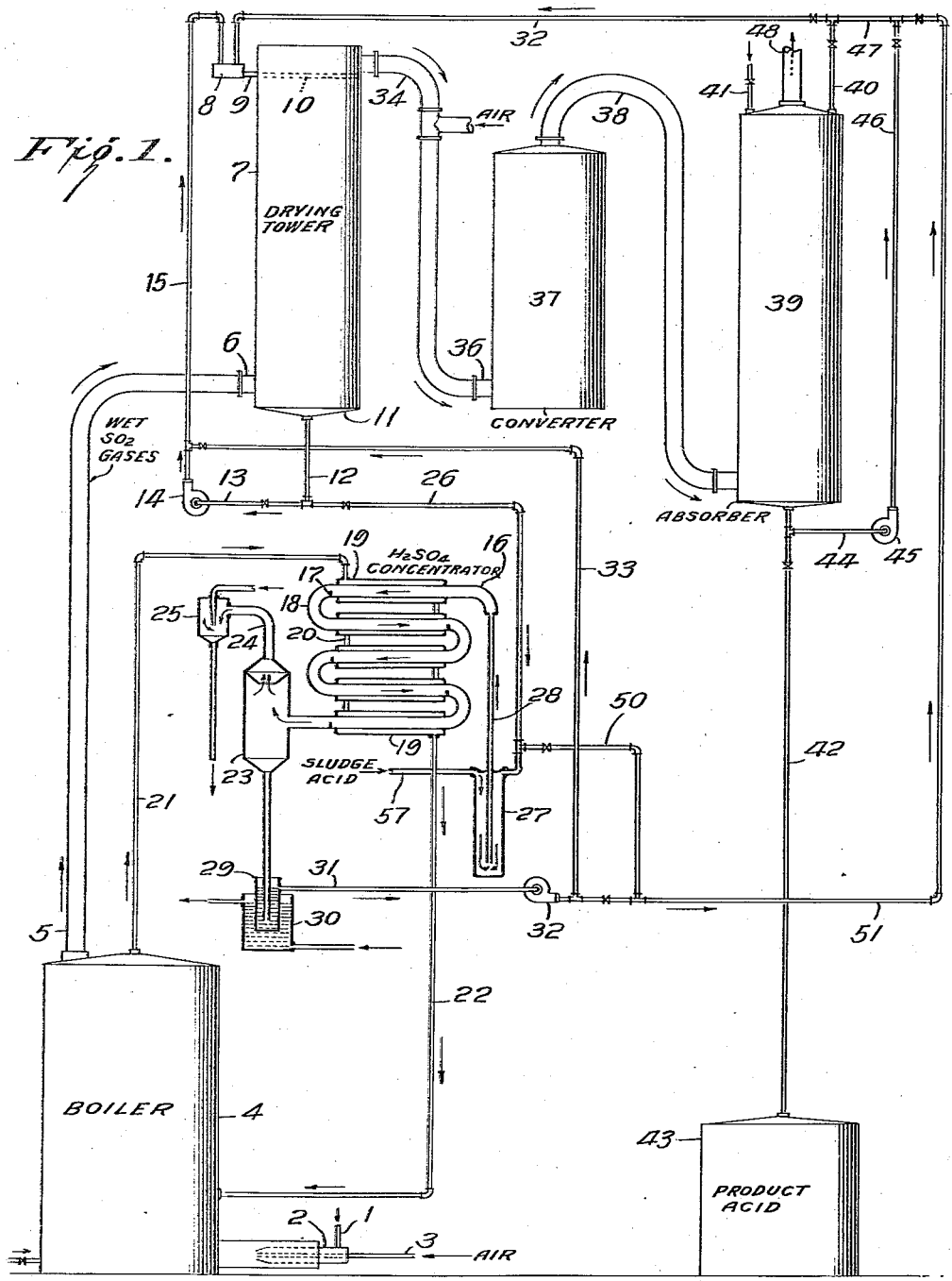

Typical installations in which the principles of the invention may be applied are illustrated diagrammatically in the accompanying drawings, in which Fig. 1 is a diagrammatic illustration of a sulphuric acid plant employing indirect heating of the drying tower acid by means of a steam boiler and Fig. 2 illustrates a plant in which direct heating of the drying tower acid is employed, using a cascade concentrator.

Referring to Fig. 1 the sulphur containing gases capable of combustion to sulphur dioxide with evolution of heat, for example hydrogen sulphide gases, are admitted to a burner 2 through pipe 1, air for the combustion being supplied through pipe 3. The sulphur dioxide, water vapor and nitrogen from the burner pass through the flues of a boiler 4, which is preferably so designed that the gases entering with an inlet temperature of some 2000° F. will leave through the stack 5 at about 800° F. and may be of the type described in Patent No. 2,122,390 dated June 28, 1938. Of course, lower stack temperatures are obtainable with an efficient boiler construction, but it is advisable to have exit temperatures in the neighborhood of those indicated in order that the gases may be well above their dew point, thus avoiding corrosion problems. The gases leaving through the stack 5 are passed with further intermediate cooling if desired to an inlet 6 at the base of a drying tower 7, which is preferably packed with acid proof brick or other packing materials to provide a large surface of contact in its interior.

The drying tower 7 is provided with a recirculating system for introducing sulphuric acid into its upper part and withdrawing it from the base. This recirculating system preferably includes a feed tank 8 mounted adjacent the upper part of the tower which communicates through a pipe 9 with a feed trough or spray head which is indicated diagrammatically at 10 and operates to distribute drying acid of about 93% strength over the packing. A collecting basin is provided at the base 11 of the tower from which acid is withdrawn through the pipes 12 and 13 and recirculated to the feed tank 8 by means of pump 14 and feed line 15. By means of this recirculating system, a stream of drying acid is continuously recirculated through the drying tower 7 at such a speed that it removes the moisture from the sulphur dioxide gases without being too greatly reduced in strength for efficient operation.

In order to maintain the drying tower acid at the strength indicated, a sulphuric acid concentrator is provided of a type which utilizes steam generated in the boiler 4. The concentrator shown consists of a series of horizontal pipes 16 provided with check dams 17 and preferably connected by U-turns 18 to form a continuous system. Each horizontal pipe is surrounded by a steam jacket 19, the separate jackets being connected by pipes 20, and the entire jacketing system being connected to a steam line 21 from the boiler and a return condensate line 22 from the lowermost jacket. The lowermost pipe of the series is connected to a trap 23, from which vapors are withdrawn through a vacuum line 24 connected with a steam jet or other vacuum pump 25.

Sulphuric acid is preferably continuously withdrawn from the recirculating system of the drying tower through the pipe 26 into a vacuum seal 27, from which it is drawn through line 28 into the inlet of the concentrator. Concentrated acid from the outlet of the concentrator passes through trap 23 and falls through a barometric leg into a seal 29, which is preferably water cooled as at 30, and is then returned to the top of the drying tower by reintroduction into the stream of drying acid through line 31, pump 32, line 33 and feed line 15 of the recirculating system.

The operation of the above described apparatus results in the production, at the top of tower 7, of a dry sulphur dioxide gas suitable for catalytic oxidation in the contact sulphuric acid process. This gas is drawn off from the top of the tower 7 through pipe 34 and dry air is added if necessary through the line 35, after which it passes through inlet 36 into the base of a catalytic converter 37, where its sulphur dioxide content is oxidized to sulphur trioxide. The converter is illustrated diagrammatically and its details form no part of the present invention, but preferably it is one using a non-poisoning, vanadium contact mass and is provided with automatic heat exchange for preheating the gases as in Patent No. 1,660,511.

The sulphur trioxide gases leaving the converter 37 through the line 38 are passed into the base of an absorber 39, which is continuously irrigated through pipe 40 by a recirculating flow of aqueous sulphuric acid, additional water being added through the line 41 if desired. A portion of the acid flowing from the base of the absorber 39 is collected through the pipe 42 into the receiver 43, and constitutes product acid from the plant. Another portion of this acid is withdrawn through the line 44 and returned through pump 45 and lines 46 to the top of the absorbing tower, to be re-used in the absorption of further amounts of sulphur trioxide from the gases. The waste gases from the absorber escape to the atmosphere through the stack 48.

In order to give greater flexibility to the process, and to utilize water absorbed from the gases in the tower 7 for producing sulphuric acid in the absorber 39, a line 50 is provided which connects the line 26 from the drying tower recirculating system with the top of the absorber 39 by way of line 51, which joins the pipe 47 forming a part of the absorber recirculating system. This line 51 is also connected to pump 32 which returns partially concentrated acid from the sulphuric acid concentrator, so that acid of any suitable strength intermediate that of the acid fed to the concentrator and that leaving the concentrator may be introduced into the sulphur trioxide absorbing system. By this provision it is possible to operate the sulphuric acid concentrator to remove only the excess water taken into the system as moisture in the hydrogen sulphide gases, the air necessary to oxidize hydrogen sulphide and that for the oxidation of sulphur dioxide to sulphur trioxide. Alternatively, by the removal of greater amounts of water in the sulphuric acid concentrator, oleum of any desired strength may be produced in the absorbing tower.

The operation of the above system will be illustrated by the following example: hydrogen sulphide is burned with air saturated with moisture at 50° F., and a 93% sulphuric acid is used to irrigate the drying tower 7 which operates at a temperature of 50° C. Assuming a plant of 50 tons daily capacity of sulphuric acid monohydrate, 32.65 tons of $SO_2$ are theoretically required per day or, actually, with 95% overall efficiency, 34.37 tons are needed. This amounts roughly to 1.5 tons of sulphur dioxide per hour and its production from hydrogen sulphide will produce 0.42 tons of chemical water. In addition to this, the moisture in the air used for hydrogen sulphide combustion and sulphur dioxide conversion will amount to 176 pounds, which constitutes diluting water in the process and must be removed by evaporation.

In the burning of pure hydrogen sulphide, approximately 3500 B. t. u. are evolved per pound of sulphur dioxide produced, the burner temperature being roughly 2000° F. Assuming a boiler efficiency of 60%, it is seen that approximately 2000 B. t. u. per pound of $SO_2$ are available for use in concentrating the drying tower acid, which is more than enough to evaporate its total excess moisture content if this should be desired.

In the installation shown, acid of 93% strength is preferably recirculated through the drying tower, and a part of the acid recirculated is preferably continuously withdrawn through the pipe 26 and reconcentrated in the sulphuric acid concentrator. Obviously, an amount of water may be removed in this manner equal to the amount taken up from the gases during the same period of time in the tower 7, in which case it is apparent that none of the chemical water will be used in forming sulphuric acid in the absorber 39. The system is quite capable of operating in this manner in case it should prove to be desirable, but usually a considerable proportion of weakened acid from the drying tower will be passed through pipes 26, 50 and 51 into the absorber while strong acid from the absorber is passed through pipes 44, 46, 47 and 52 into the drying tower. This removes much of the load from the sulphuric acid concentrator, and the increased capacity may be used for concentrating sludge acid which is introduced through the line 57 as has previously been described.

The plant illustrated diagrammatically in Fig. 2 is generally similar to that of Fig. 1, but distinguishes from it in the use of a sulphuric acid concentrator of the direct heating type instead of a steam boiler and by the use of a plurality of drying towers. Hot sulphur dioxide gases containing steam are furnished by a burner 60, which may be a secondary furnace of the type referred to above. This furnace consists of two chambers with a common heat exchange wall, the upper chamber having an inlet for the sulphur dioxide gas near the front and the lower chamber having an oil burner at its rear and a gas outlet at its front end. Hot gases from this source are introduced as at 61 into the base of a sulphuric acid concentrator of the cascade type, consisting essentially of a flue 62 of acid proof refractory material and a number of concentrating pans 63 in cascade. These pans are so mounted as to receive weak acid in the uppermost pan, which is heated by gases of the lowest temperature, and the acid overflows downwardly from one pan to another until the strongest acid in the lowermost pan is heated by the hottest gases. The gases leaving the concentrator through the outlet 64 are passed directly or after suitable cooling to an inlet 65 in the base of the first drying tower 66, while strong acid runs from the lowermost pan of the concentrator through a pipe 67 into a receiver 68 which is preferably provided with a cooling jacket.

The drying tower 66 is of substantially the same type as drying tower 7 of Fig. 1 and is provided with an outside recirculating system for introducing sulphuric acid into its upper part and withdrawing it from the base. This recirculating system includes a feed tank 70 adjacent the upper part of the tower and communicating therewith through pipe 71, a drain pipe 72, and elevating pump 73 and feed lines 74 and 75 for completing the circuit. Acid from the drying tower recirculating system is passed to the concentrator through pipe 76 together with weak acid from other sources if desired, and partially concentrated acid is returned to the drying tower system through pump 77 and lines 78 and 79 for re-use.

Partially dried gases from the top of tower 66 are withdrawn through pipe 80 and introduced into the base of a second drying tower 81, which completes the dehydration. This tower is also provided with an outside recirculating system for drying acid, consisting of a feed tank, pump, and pipe lines similar to those provided for tower 66. A piping system is preferably provided for connecting this second drying tower with the sulphur trioxide absorber, in order to introduce sufficient strong acid into the feed tank to maintain a constant concentration of acid in the drying tower and to feed weakened acid from the base of the drying tower into the top of the absorber. This system is not illustrated as it is more or less conventional and forms no part of the present invention.

The purpose of using a plurality of drying towers instead of the single tower shown in Fig. 1 is to give greater flexibility to the process. Drying acid of a strength less than 61° Bé. is highly advantageous for use in the present invention, for below this point it may be concentrated by simple heating without distilling off sulphuric acid. We have found that sulphuric acid of this strength is well suited for use in the first drying tower, since it may be reconcentrated without using a reflux condenser. Sulphur dioxide gases in equilibrium at 50° C. with acid of this strength at the top of tower 66 will contain only about 4% moisture by volume, and this small amount of water vapor is readily removed in the tower 81 by strong acid from the absorber without difficulty.

The dry sulphur dioxide gases leaving the top of tower 81 are passed, with the addition of air or oxygen if necessary, through pipe 82 into a converter 83, which is preferably of the automatically cooled type and contains a non-poisoning vanadium catalyst as described in conjunction with Fig. 1. Sulphur trioxide gases leaving the converter through the pipe 84 are passed to an absorber 85, which is irrigated with a portion of the product acid leaving the absorber through pipe 86 together with the addition of partially concentrated acid from the tank 68 which enters through line 87. A pipe 88 may also be provided for the addition of water to the absorber, in cases where it is not desired to use acid from the converter for this purpose.

From the above description it will be seen that the present invention provides a system of great flexibility which not only permits the utilization of wet sulphur dioxide gases for the production of sulphuric acid monohydrate or oleum, but also permits the simultaneous concentration of weak sulphuric acid from other sources if desired. While the invention has been described in conjunction with certain specific installations, it is understood that these are for illustrative purposes only, and that in its broader aspects the invention is limited only by the scope of the appended claims.

What we claim is:

1. A method of simultaneously producing concentrated sulphuric acid from hydrogen sulfide and concentrated separated sludge acid which comprises burning hydrogen sulfide to form a moisture laden $SO_2$ gas, drying the $SO_2$ gas by a circulation of sulphuric acid, oxidizing the dried $SO_2$ to $SO_3$ in a contact sulphuric acid process, introducing a portion of the diluted acid from the drying circuit together with separated sludge acid into a concentrator and subjecting the acid mixture in said concentrator to heat produced as a result of the combustion of $H_2S$ to partially concentrate said acid mixture, introducing a portion of said partially concentrated acid into the drying acid circuit, absorbing the $SO_2$ produced by the contact process in an absorber circuit and introducing the remaining portion of the partially concentrated acid from the concentrator into said absorption circuit in order to transform it into strong sulphuric acid.

2. A method according to claim 1 in which the concentrator is of the direct heating type and the gases from the combustion of the $H_2S$ are utilized as the direct heating gases in said concentrator whereby a portion of the heat of combustion of the $H_2S$ is utilized to remove water from the acid mixture in the concentrator and the gases are cooled.

PETER S. GILCHRIST.
JAMES M. RUMPLE.